United States Patent
Fernald et al.

(10) Patent No.: US 6,519,388 B1
(45) Date of Patent: *Feb. 11, 2003

(54) TUBE-ENCASED FIBER GRATING

(75) Inventors: Mark R. Fernald, Enfield, CT (US); Timothy J. Bailey, Longmeadow, MA (US); Matthew B. Miller, Glastonbury, CT (US); James M. Sullivan, Manchester, CT (US); Michael A. Davis, Glastonbury, CT (US); Peter Ogle, Charlestown, RI (US); Alan D. Kersey, South Glastonbury, CT (US); Martin A. Putnam, Cheshire, CT (US); Robert N. Brucato, Waterbury, CT (US); Paul E. Sanders, Madison, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,865

(22) Filed: Dec. 6, 1999

Related U.S. Application Data (63) Continuation-in-part of application No. 09/399,495, filed on Sep. 20, 1999, now abandoned, which is a continuation-in-part of application No. 09/205,943, filed on Dec. 4, 1998, now abandoned.

(51) Int. Cl.$^7$ .............................. G02B 6/34; G02B 6/287
(52) U.S. Cl. .................... 385/37; 385/123; 385/128; 65/382; 65/392; 65/428
(58) Field of Search .................. 385/37, 123–128; 359/566, 576; 264/434; 427/461; 65/428, 33.5, 36

(56) References Cited

U.S. PATENT DOCUMENTS 4,636,031 A   1/1987   Schmadel, Jr. et al. ..   350/96.19

(List continued on next page.)

FOREIGN PATENT DOCUMENTS

DE   19724528   12/1998

(List continued on next page.)

OTHER PUBLICATIONS

M.G. Xu, . Geiger and J. P. Dakin for "Fibre grating pressure sensor with enhanced sensitivity using a glass–bubble housing"–Electronics Letters–Jan. 18$^{th}$, 1996 vol. 32, No. 2.

(List continued on next page.)

Primary Examiner—John D. Lee
Assistant Examiner—Juliana K. Kang (57) ABSTRACT

A tube-encased fiber grating includes an optical fiber 10 having at least one Bragg grating 12 impressed therein which is embedded within a glass capillary tube 20. Light 14 is incident on the grating 12 and light 16 is reflected at a reflection wavelength $\lambda 1$. The shape of the tube 20 may be other geometries (e.g., a "dogbone" shape) and/or more than one concentric tube may be used or more than one grating or pair of gratings may be used. The fiber 10 may be doped at least between a pair of gratings 150,152, encased in the tube 20 to form a tube-encased compression-tuned fiber laser or the grating 12 or gratings 150,152 may be constructed as a tunable DFB fiber laser encased in the tube 20. Also, the tube 20 may have an inner region 22 which is tapered away from the fiber 10 to provide strain relief for the fiber 10, or the tube 20 may have tapered (or fluted) sections 27 which have an outer geometry that decreases down to the fiber 10 and provides added fiber pull strength. Also, the tube-encased grating 12 exhibits lower mode coupling from the fiber core to the cladding modes due to the increased diameter of the cladding where the tube 20 is fused to the fiber 10 where the grating is located 12.

41 Claims, 6 Drawing Sheets

U.S. PATENT DOCUMENTS

| | | | |
|---|---|---|---|
| 4,704,151 A | 11/1987 | Keck | 65/4.1 |
| 4,915,467 A | 4/1990 | Berkey | 350/96.15 |
| 4,932,263 A | 6/1990 | Wlodarczyk | 73/705 |
| 4,948,217 A | 8/1990 | Keck et al. | 350/96.15 |
| 5,007,705 A | 4/1991 | Morey et al. | 350/96.29 |
| 5,042,898 A | 8/1991 | Morey et al. | 385/37 |
| 5,136,677 A | 8/1992 | Drexhage et al. | 385/123 |
| 5,202,939 A | 4/1993 | Belleville et al. | 385/12 |
| 5,235,659 A | 8/1993 | Atkins et al. | 385/124 |
| 5,367,589 A * | 11/1994 | MacDonald et al. | 385/37 |
| 5,392,117 A | 2/1995 | Belleville et al. | 356/352 |
| 5,399,854 A | 3/1995 | Dunphy et al. | 250/227.17 |
| 5,469,520 A | 11/1995 | Morey et al. | 385/37 |
| 5,511,083 A | 4/1996 | D'Amato et al. | 372/6 |
| 5,512,078 A | 4/1996 | Griffin | 65/484 |
| 5,519,803 A | 5/1996 | Shiono et al. | 385/132 |
| 5,537,499 A * | 7/1996 | Brekke | 385/31 |
| 5,578,106 A | 11/1996 | Fleming, Jr. et al. | 65/391 |
| 5,594,819 A * | 1/1997 | Narendran et al. | 385/12 |
| 5,612,778 A | 3/1997 | Hall et al. | 356/4.09 |
| 5,682,453 A | 10/1997 | Daniel et al. | 65/99 |
| 5,684,297 A | 11/1997 | Cable | 250/227.14 |
| 5,691,999 A | 11/1997 | Ball et al. | 373/20 |
| 5,721,802 A | 2/1998 | Francis et al. | 385/137 |
| 5,745,626 A | 4/1998 | Duck et al. | 385/96 |
| 5,757,540 A * | 5/1998 | Judkins et al. | 359/341 |
| 5,771,251 A | 6/1998 | Kringlebotn et al. | 372/6 |
| 5,841,131 A | 11/1998 | Schroeder et al. | 250/227.17 |
| 5,844,927 A | 12/1998 | Kringlebotn et al. | 372/6 |
| 5,926,599 A | 7/1999 | Bookbinder et al. | 385/137 |
| 6,018,534 A | 1/2000 | Pan et al. | 372/6 |
| 6,056,436 A * | 5/2000 | Sirkis et al. | 374/161 |
| 6,058,226 A * | 5/2000 | Starodubov | 385/12 |
| 6,069,988 A * | 5/2000 | Kokura et al. | 385/37 |
| 6,122,430 A | 9/2000 | Bookbinder et al. | 385/137 |
| 6,125,216 A * | 9/2000 | Haran et al. | 385/12 |
| 6,301,410 B1 | 10/2001 | Carberry et al. | 385/37 |
| 6,307,990 B1 | 10/2001 | Carberry et al. | 385/37 |
| 6,349,165 B1 | 2/2002 | Lock | 385/136 |
| 6,363,089 B1 * | 3/2002 | Fernald et al. | 372/20 |

FOREIGN PATENT DOCUMENTS

| | | | |
|---|---|---|---|
| EP | 0162303 | 12/1991 | |
| EP | 0359351 | 9/1992 | C03B/37/15 |
| EP | 0302745 | 3/1994 | |
| EP | 0409447 | 11/1996 | |
| EP | 0855608 | 7/1998 | |
| GB | 2299203 | 9/1996 | |
| NO | 305004 | 6/1997 | |
| WO | WO8204328 | 12/1982 | |
| WO | WO9530926 | 11/1995 | |
| WO | WO9932911 | 3/1998 | |
| WO | WO9944026 | 2/1999 | |

OTHER PUBLICATIONS

Quartzdyne, Inc., Series QU–QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.

"The Thickness–Shear Quartz Resonator: A Rugged, Precision Pressure Transducer" Product Feature from SENSORS, Jul. 1990.

"Design of DFB Fibre lasers", V. C. Lauridsen et al, Electron. Lett., vol. 34, No. 21, pp. 2028–2030. 1998.

"Erbium doped fibre DFB laser with permanent $\pi/2$ phase–shift induced by UV post–processing", P. Varming et al, IOOC 95, Tech. Digest, vol. 5, PD1–3, 1995.

* cited by examiner

TUBE-ENCASED FIBER GRATING

CROSS REFERENCES TO RELATED APPLICATIONS

This is a continuation-in-part of U.S. patent application, Ser. No. 09/399,495 filed Sep. 20, 1999, (now abandoned) entitled "Tube Encased Fiber Grating" which is a continuation-in-part of 09/205,943 filed Dec. 4, 1998 (now abandoned). Also, copending U.S. patent applications, Ser. No. 09/455,867 (CiDRA Docket No. CC-0036B), entitled "Bragg Grating Pressure Sensor"; Serial No. (CiDRA Docket No. CC-0128B) 09/455,866, entitled "Strain-Isolated Bragg Grating Temperature Sensor"; and Serial No. (CiDRA Docket No. CC-0146B) 09/456,113, entitled "Pressure-Isolated Bragg Grating Temperature Sensor", all filed contemporaneously herewith, contain subject matter related to that disclosed herein.

TECHNICAL FIELD

This invention relates to fiber gratings, and more particularly to a tube-encased fiber grating.

BACKGROUND ART

It is known in the art of fiber optics that Bragg gratings embedded in the fiber may be used to sense parameters such as temperature and strain, such as is described in U.S. Pat. No. 4,806,012, entitled "Distributed, Spatially Resolving Optical Fiber Strain Gauge", to Meltz et al, and U.S. Pat. No. 4,996,419, entitled "Distributed Multiplexed Optical Fiber Bragg Grating Sensor Arrangement", to Morey, which are incorporated herein by reference to the extent necessary to understand the present invention. It is also known that fiber gratings may be used in compression to act as a tunable filter or tunable fiber laser, as is described in U.S. Pat. No. 5,469,520, entitled "Compression Tuned Fiber Grating" to Morey, et al and U.S. Pat. No. 5,691,999, entitled "Compression Tuned Fiber Laser" to Ball et al., respectively, which are incorporated herein by reference to the extent necessary to understand the present invention.

However, when a fiber grating by itself, is compressed, the fiber buckles. One technique used to avoid fiber buckling is to use sliding ferrules around the fiber and grating and to place the ferrules in a mechanical structure to guide, align and confine the ferrules and the fiber. Such a technique is described in the aforementioned U.S. Pat. Nos. 5,469,520 and 5,691,999. However, it would be desirable to obtain a configuration that allows a fiber grating to be compressed without buckling and without sliding ferrules and without requiring such a mechanical structure.

It is also known that Bragg gratings in optical fibers may create unwanted coupling between the core and cladding modes of a fiber. The larger the mode field overlap between the two modes, the larger the coupling. Such coupling creates unwanted optical losses in the fiber.

SUMMARY OF THE INVENTION

Objects of the present invention include provision of a fiber grating configuration that allows the grating to be used in compression without requiring sliding ferrules or a mechanical supporting structure and/or that is suitable for reducing core to cladding coupling.

According to the present invention a tube-encased fiber optic Bragg grating, comprises an optical fiber, having at least one Bragg grating embedded therein; and a tube, having the optical fiber and the Bragg grating encased therein along a longitudinal axis of the tube, the tube being fused to at least a portion of the fiber at a location where at least a portion of the Bragg grating is located.

According fiurther to the present invention, the tube is made of a glass material. According flirther to the present invention the tube is fused to the optical fiber on opposite axial sides of the Bragg grating.

The present invention provides a fiber grating encased in and fused to at least a portion of a capillary tube and a method for making same. The tube may be made of a glass material for encasing a glass fiber. The encased grating allows the grating to be compressed without buckling the fiber. Also, it allows the grating to be strain isolated from strains elsewhere on the fiber. The invention may also be used in numerous applications where fiber grating compression may be used, e.g.,parameter sensing or wavelength tuning. Also, the invention exhibits lower mode coupling from the fiber core to the cladding modes due to the effective increased diameter of the cladding where the tube is fused to the fiber where the grating is located.

The grating may be embedded (or imprinted) in the fiber before or after the fiber is encased in the tube. To cause the fiber to become encased in and fused to the tube, the tube may be heated and collapsed around the fiber.

Also, one or more gratings, fiber lasers, or a plurality of fibers may be encased in the tube. The grating(s) or laser(s) are "encased" in the tube by having the tube fused to the fiber on the grating area and/or on opposite axial ends of the grating area adjacent to or a predetermined distance from the grating. The grating(s) or laser(s) may be fused within the tube or partially within or to the outer surface of the tube.

The foregoing and other objects, features and advantages of the present invention will become more apparent in light of the following detailed description of exemplary embodiments thereof.

BEST MODE FOR CARRYING OUT THE INVENTION

Figure 1:
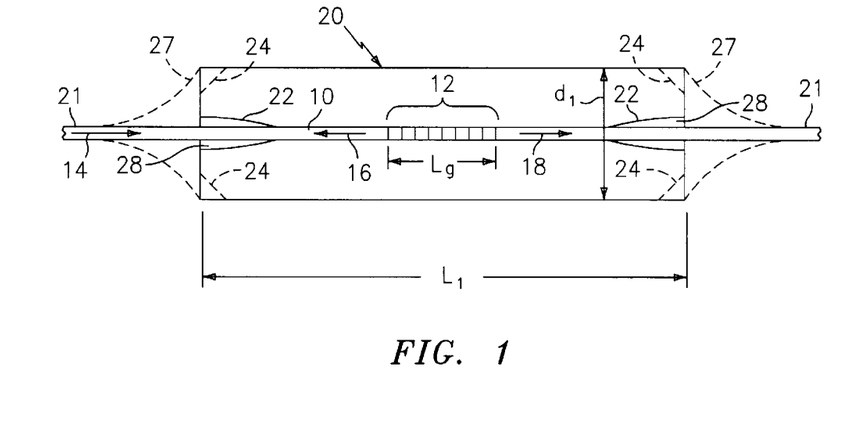
FIG. 1 is a side view of a tube-encased fiber grating, in accordance with the present invention.

Referring to FIG. 1, a tube-encased fiber Bragg grating comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass ($SiO_2$) having the appropriate dopants, as is known, to albw light 14 to propagate along the fiber 10. The grating 12 is similar to that described in U.S. Pat. Nos. 4,725,110, and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. However, any wavelength-tunable grating or reflective element embedded, etched, imprinted, or otherwise formed in the fiber 28 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, e.g., silica, phosphate glass, or other glasses, or made of glass and plastic, or solely plastic. For high temperature applications, optical fiber made of a glass material is desirable. Also, the fiber 10 may have an outer diameter of 80 microns or other diameters. Further, instead of an optical fiber, any optical waveguide may be used, such as, a multi-mode, birefringent, polarization maintaining, polarizing, multi-core, or multicladding optical waveguide, or a flat or planar waveguide (where the waveguide is rectangular shaped), or other waveguides. As used herein the term "fiber" includes the above described waveguides.

The light 14 is incident on the grating 12 which reflects a portion thereof as indicated by a line 16 having a predetermined wavelength band of light centered at a reflection wavelength λb, and passes the remaining wavelengths of the incident light 14 (within a predetermined wavelength range), as indicated by a line 18.

The fiber 10 with the grating 12 therein is encased within and fused to at least a portion of a cylindrical glass capillary tube 20 having an outer diameter dl of about 3 mm and a length L1 of about 10 mm. The grating 12 has a length Lg of about 5 mm. Alternatively, the length L1 of the tube 20 may be substantially the same length as the length Lg of the grating 12, such as by the use of a longer grating, or a shorter tube. Other dimensions and lengths for the tube 20 and the grating 12 may be used. Also, the fiber 10 and grating 12 need not be fused in the center of the tube 20 but may be fused anywhere in the tube 20. Also, the tube 20 need not be fused to the fiber 10 over the entire length L1 of the tube 20.

The tube 20 is made of a glass material, such as natural or synthetic quartz, fused silica, silica ($SiO_2$), Pyrex® by Corning (boro silicate), or Vycor® by Coming (about 95% silica and 5% other constituents such as Boron Oxide), or other glasses.

The tube should be made of a material such that the tube 20 (or the inner diameter surface of a bore hole in the tube 20) can be fused to (i.e., create a molecular bond with, or melt together with) the outer surface (or cladding) of lie optical fiber 10 such that the interface surface between the inner diameter of the tube 20 and the outer diameter of the fiber 10 become substantially eliminated (i.e., the inner diameter of the tube 20 cannot be distinguished from the cladding of the fiber 10).

For best thermal expansion matching of the tube 20 to the fiber 10 over a large temperature range, the coefficient of thermal expansion (CTE) of the material of the tube 20 should substantially match the CTE of the material of the fiber 10, e.g.,fused silica tube and optical fiber. In general, the lower the melting temperature of the glass material, the higher the CTE. Thus, for a silica fiber (having a high melting temperature and low CTE) and a tube made of another glass material, such as Pyrex® or Vycor® (having a lower melting temperature and higher CTE) results in a thermal expansion mismatch between the tube 20 and the fiber 10 over temperature. However, it is not required for the present invention that the CTE of the fiber 10 match the CTE of the tube 20 (discussed more hereinafter).

Instead of the tube 20 being made of a glass material, other materials may be used provided the tube 20 can be fused to the fiber 10. For example, for an optical fiber made of plastic, a tube made of a plastic material may be used.

The axial ends of the tube 20 where the fiber 10 exits the tube 20 may have an inner region 22 which is inwardly tapered (or flared) away from the fiber 10 to provide strain relief for the fiber 10 or for other reasons. In that case,an area 28 between the tube 20 and the fiber 10 may be filled with a strain relief filler material, e.g., polyimide, silicone, or other materials. Also, the tube 20 may have tapered (or beveled or angled) outer comers or edges 24 to provide a seat for the tube 20 to mate with another part (not shown) and/or to adjust the force angles on the tube 20, or for other reasons. The angle of the beveled corners 24 are set to achieve the desired function. The tube 20 may have cross-sectional shapes other than circular, such as square, rectangular, elliptical, clam-shell ,or other shapes, and may have side-view sectional shapes other than rectangular, such as circular, square, elliptical, clamshell, or other shapes.

Alternatively, instead of having the inner tapered region 22, one or both of the axial ends of the tube 20 where the fiber 10 exits the tube 20 may have an outer tapered (or fluted, conical, or nipple) section, shown as dashed lines 27, which has an outer geometry that decreases down to the fiber 10 (discussed more hereinafter with FIG. 12). We have found that using the fluted sections 27 provides enhanced pull strength at and near the interface where the fiber 10 exits the tube 20, e.g., 6 lbf or more, when the fiber 10 is pulled along its longitudinal axis.

Where the fiber 10 exits the tube 20, the fiber 10 may have an external protective buffer layer 21 to protect the outer surface of the fiber 10 from damage. The buffer 21 may be made of polyimide, silicone, Teflon® (polytetraflouroethylene), carbon, gold, and/or nickel, and have a thickness of about 25 microns. Other thicknesses and buffer materials for the buffer layer 21 may be used. If the inner tapered region 22 is used and is large enough, the buffer layer 21 may be inserted into the region 22 to provide a transition from the bare fiber to a buffered fiber. Alternatively, if the axial end of the tube 20 has the external taper 27, the buffer 21 would begin where the fiber exits the tapered 27 portion of the tube 20. If the buffer 21 starts after the fiber exit point, the exposed bare portion of the fiber 10 may be recoated with an additional buffer layer (not shown) which covers any bare fiber outside of the tube 20 and may also overlap with the buffer 21 and/or some of the tapered region 27 or other geometrically shaped axial end of the tube 20.

To encase and fuse the fiber 10 within the tube 20, the tube 20 may be heated, collapsed and fused around the grating 12 (or grating area) as discussed hereinafter.

The Bragg grating 12 may be impressed in the fiber 10 before or after the capillary tube 20 is encased around the fiber 10 and grating 12.

For any of the embodiments shown herein, the fiber 10 and/or the grating 12 may be fused to the tube 20 having an initial pre-strain on the fiber 10 and/or grating 12 (compression or tension) or no pre-strain. For example, if Pyrex® or another glass that has a larger coefficient of thermal expansion than that of the fiber 10 is used for the tube 20, when the tube 20 is heated and fused to the fiber and thencooled, the grating 12 is put in compression by the tube 20. Alternatively, the fiber grating 12 may be encased in the tube 20 in tension by putting the grating in tension during the tube heating and fusing process. Also, the fiber grating 12 may be encased in the tube 20 resulting in neither tension nor compression on the grating 12.

If the grating 12 is impressed in the fiber 10 after the tube 20 is encased around the grating 12, the grating 12 may be written through the tube 20 into the fiber 10 as is described in copending U.S. patent application, Ser. No. 09/205,845, now U.S. Pat. No. 6,298,184, (Cidra Docket No. CC-0130), entitled "Method and Apparatus For Forming A Tube-Encased Bragg Grating", filed Dec. 4, 1998, and incorporated herein by reference.

If the grating 12 is impressed in the fiber 10 before the tube 20 is encased around the grating 12, the melting temperature of the capillary tube 20 should be low enough to allow the glass tube 20 to become soft and fuse to the optical fiber 10 without significantly "bleaching out" (or annealing or weakening) the grating 12 reflectivity below the desired level, which may occur when a grating is exposed to high temperatures. Capillary tubing made of Pyrex® or equivalent glass has a softening temperature lower than that of a quartz fiber and thus is suitable for this purpose. If Pyrex® or another glass that has a larger coefficient of thermal expansion (CTE) than that of the fiber 10 is used for the tube 20, when the tube 20 is heated and fused to the fiber and then cooled, the grating 12 is put in compression by the tube 20. Alternatively, the fiber grating 12 may be encased in the tube 20 in tension by putting the grating in tension during the tube heating and fusing process. Also, the fiber grating 12 may be encased in the tube 20 resulting in neither tension nor compression on the grating 12.

Figure 2:
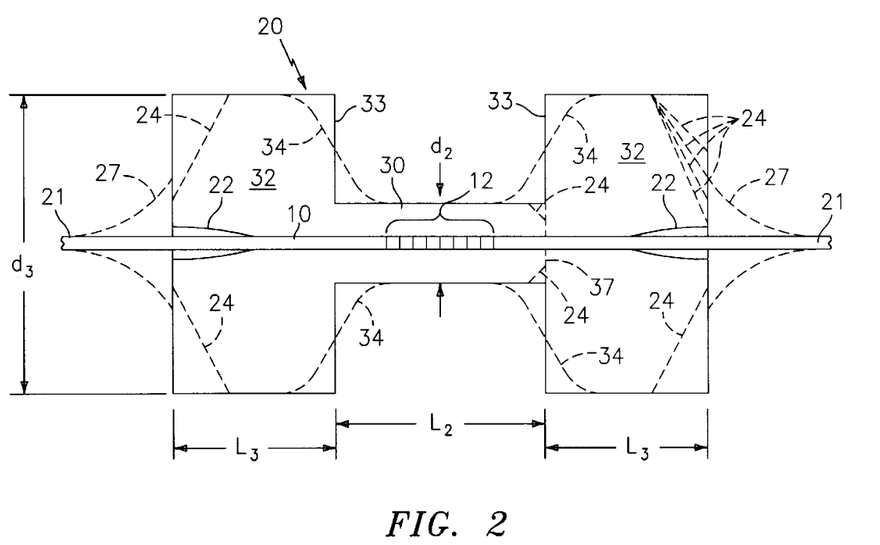
FIG. 2 is a side view of a tube-encased fiber grating having an alternative geometry for the tube, in accordance with the present invention.

Referring to FIG. 2, the capillary tube 20 may have a varying geometry, depending on the application. For example, the tube 20 may have a "dogbone" shape having a narrow central section 30 and larger outer sections 32. The narrow section 30 has an outer diameter d2 of about 2 mm, and a length L2 of about 9.25 mm. The large sections 32 have an outer diameter d3 of about 4 mm and a length L3 of about 6.35 mm. Other lengths L2,L3 of the sections 30,32 may beused. For example, the length L3 may be much more than 6.36 mm (e.g., greater than 25.4 mm long) or may be much less than 6.36 mm long. Alternative dimensions may be: d2=1 mm, d3=3 mm, L3=4 mm, L2=7.37 mm. Other dimensions may be used if desired, dqending on the application.

The dogbone shape may be used to provide increased force to grating wavelength shift sensitivity when used in a compression-based force or pressure sensor application or for gripping the tube 20 in a tension configuration, such as is described in copending U.S. patent application, Ser. No. 09/455,867 (CiDRA Docket No. CC-0036B), entitled "Fiber Grating Pressure Sensor", or a compression based tunable grating and laser application such as is described in Copending U.S. Pat. No. 6,229,827 (CiDRA Docket No. CC-0129B), entitled "Compression Tuned Fiber Grating and Laser", filed contemporaneously herewith, or may be used for other applications. Also, the dimensions for the dogbone are easily scalable to provide the desired amount of sensitivity.

An inner transition region 33 of the large sections 32 may be a sharp edge or may be curved as indicated by dashed lines 34. A curved geometry 34 has less stress risers than a sharp edge or comer and thus reduces the likelihood of breakage. Also, the sections 32 of the tube 20 may have the inner tapered regions 22 or the outer fluted sections 27 at the ends of the tube 20, as discussed hereinbefore. Further, the sections 32 may have the tapered (or beveled) outer corners 24 as discussed hereinbefore.

Also, it is not required that the dogbone geometry be symmetric, e.g., the lengths L3 of the two sections 32 may be different if desired. Alternatively, the dogbone may be a single-sided dogbone, where instead of the having the two larger sections 32, there may be only large section 32 on one side of the narrow section 30 and the other side may have a straight edge 37 which may have beveled comers 24 as discussed hereinbefore. In that case, the dogbone has the shape of a "T" on its side. Such a single-sided dogbone shall also be referred to herein as a "dogbone" shape. Instead of a dogbone geometry, other geometries that provide enhanced strain sensitivity or adjust force angles on the tube 20 or provide other desirable characteristics may be used.

Figure 3:
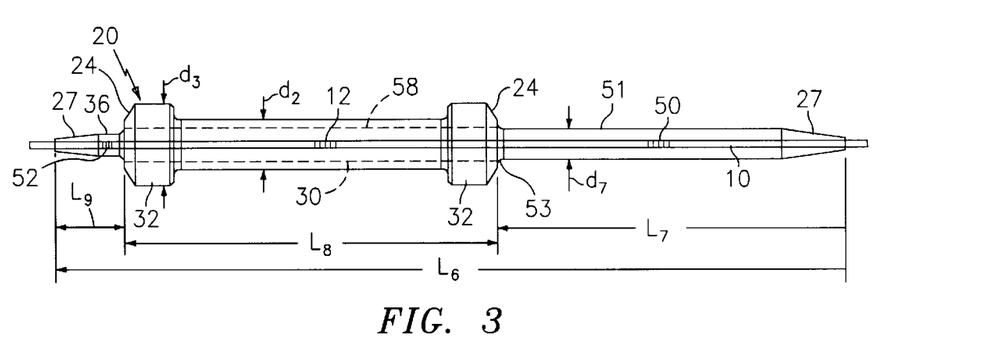
FIG. 3 is a side view of a tube-encased fiber grating having an alternative geometry for the tube, in accordance with the present invention.

Referring to FIG. 3, an alternative geometry for the capillary tube 20 may have other axial extending geometries. In particular, the left side of the tube 20 may have an axial extended section 36 which may have the fluted section 27 at the end. Also, the right side of the tube 20 may have an axial extended section 51 (which may have the fluted section 27 at the end) that is longer than the other axial end 36. Further, the fiber 10 in one or both of the axial extended sections 36,51 may have gratings 52,50, respectively. Some example dimensions for the tube 20 of FIG. 3 are as follows, other dimensions may be used. In particular, L6 is about 26.7 mm, L7 is about 11.66 mm, L8 is about 12.7 mm, L9 is about 2.29 mm, and d7 is about 0.813 mm, and d2,d3 and the other dimensions of the dogbone are as discussed hereinbefore. The long axial end 51 may be made by the methods discussed herein for making the dogbone or other shapes for the tube 20, or may be made by fusing the section 51 to the section 32 (before or after the fiber 10 is encased in the tube 20) at a point 53 or may be made. Alternatively, the tube 20 shown in FIG. 3 with the section 51 may be formed by using two tubes, an inner tube with the length L6 slid through a hole 58 in the dogbone sections 30,32 and fused to the sections 30,32 similar to that discussed hereinafter with FIG. 5.

It should be understood that the dimensions, geometries, and materials described for any of the embodiments herein, are merely for illustrative purposes fid as such, any other dimensions, geometries, or materials may be used if desired, depending on the application, size, performance, manufacturing or design requirments, or other factors, in view of the teachings herein.

Figure 4:
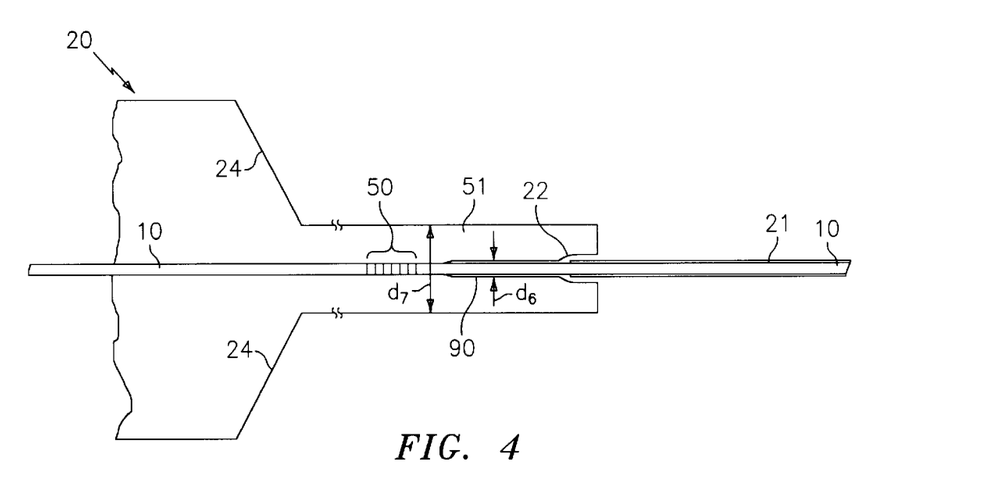
FIG. 4 is a side view of a tube-encased fiber grating having an alternative geometry for the tube, in accordance with the present invention.

Referring to FIG. 4, the long axial end 51 may be fused to the fiber 10 near where the grating 50 is located and not fused onto the fiber 10 at a region 90 near the end of the section 51. In that case, the region 90 may be filled with an epoxy or other filler discussed hereinbefore. The inner diameter d6 of the tube 20 in the section 90 is about 0.01 to 10 microns larger than the diameter of the optical fiber 10, e.g., 125.01 to 135 microns. Other diameters and dimensions may be used if desired. Where the fiber 10 exits the extended region 51, the fiber 10 may have the external protective buffer layer 21 to protect the outer surface of the fiber 10 from damage, as discussed hereinbefore.

Figure 5:
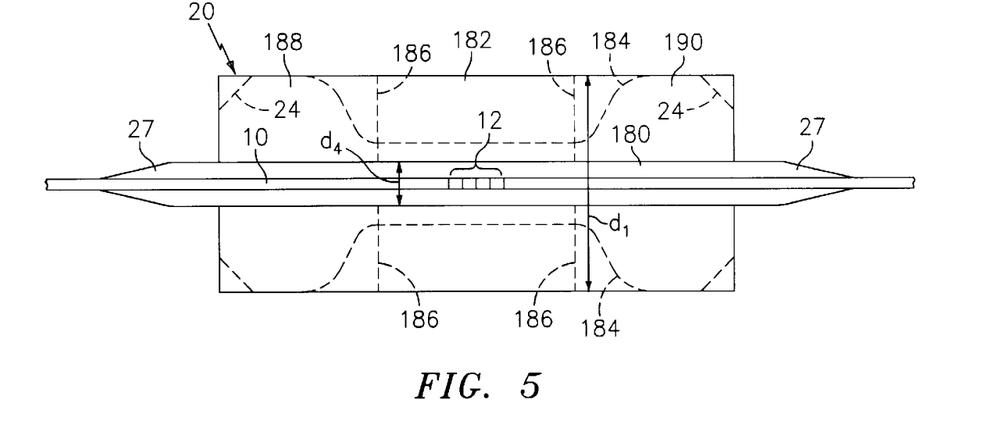
FIG. 5 is a side view of a glassencased fiber grating having more than one tube around the grating, in accordance with the present invention.

Referring to FIG. 5, more than one concentric tube may be fused together to form the tube 20 of the tube-encased grating of the present invention. For example, a small inner capillary tube 180 having an outer diameter d4 of about 0.5 mm (0.0197 in.), may be located within a larger outer capillary tube 182, having the diameter d1 discussed hereinbefore, and the two tubes 180,182 are fused together. One or both ends of the small tube 180 may be shrunk down around the fiber 10 to form the fluted sections 27. Other values for the diameters d1, d4, of the inner and outer tubes 180,182, may be used if desired. Also, more than two concentric capillary tubes may be used. The material of the tubes may be the same to minimize thermal expansion mismatch over temperature. Also, the shape of the outer tube 182 may have a dogbone shape as indicated by dashed lines 184, or other shapes as discussed hereinbefore. Alternatively, the dogbone shape may be created by fusing two separate tubes 188,190 onto the inner tube 180 on opposite axial sides of the grating 12, as indicated by dashed lines 186.

Figure 6:
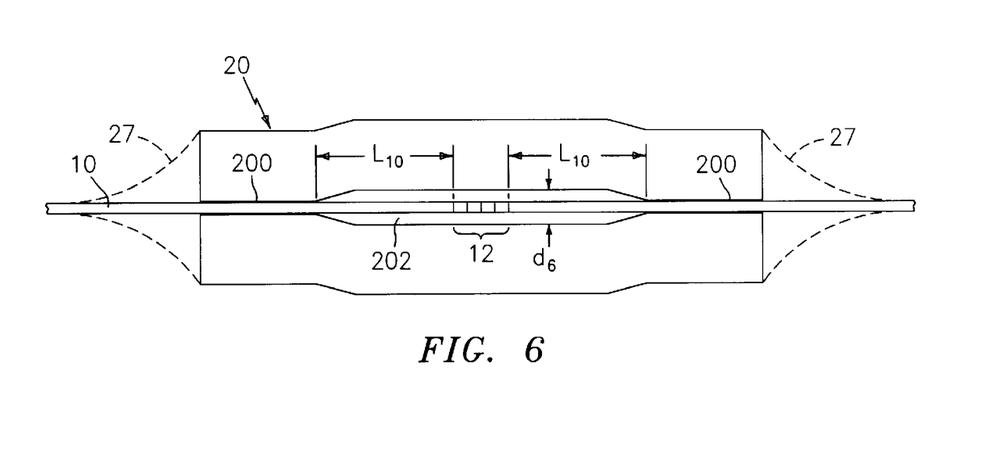
FIG. 6 is a side view of a tube-encased fiber grating where the tube is fused on opposite axial ends of the grating area, in accordance with the present invention.
Figure 7:
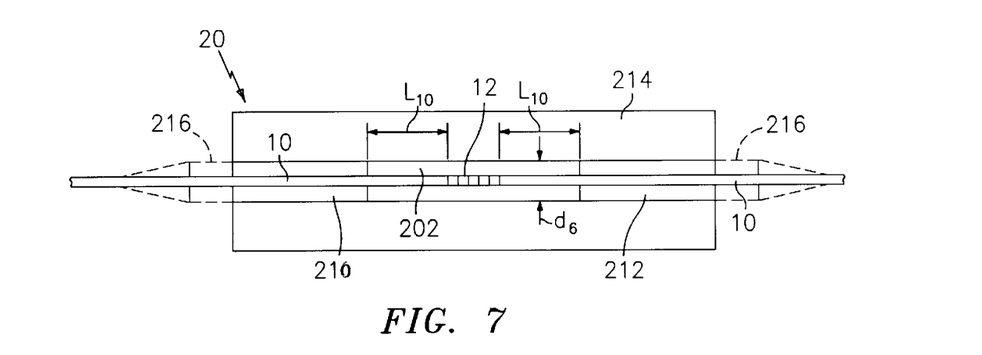
FIG. 7 is a side view of an alternative tube-encased fiber grating where the tube is fused on opposite axial ends of the grating area, in accordance with the present invention.

Referring to FIGS. 6 and 7, alternatively, the tube 20 may be fused to the fiber 10 on opposite axial ends of the grating 12 adjacent to or a predetermined distance L10 from the grating 12, where L10 can any desired length or at the edge of the grating 12 (L10=zero). In particular, regions 200 of the tube 20 are fused to the fiber 10 and a central section 202 of the tube around the grating 12 is not fused to the fiber 10. The region 202 around the grating 12 may contain ambient air or be evacuated (or be at another pressure) or may be partially or totally filled with an adhesive, e.g., epoxy, or other filling material, e.g., a polymer or silicone, or another material.

As discussed hereinbefore, the inner diameter d6 of the tube 20 is about 0.01 to 10 microns larger than the diameter of the optical fiber 10, e.g., 125.01 to 135 microns. Other diameters may be used; however, to help avoid fiber buckling when the tube 20 is axially compressed, the diameter d6 should be as close as possible to the fiber 10 outer diameter. Also, the distance L10 need not be symmetric around both sides of the grating 12. Referring to FIG. 7, alternatively, the same result can be achieved by fusing two separate tubes 210,212 on opposite sides of the grating 12 and then fusing an outer tube 214 across the tubes 210,212. Alternatively, the tubes 210,212 may extend beyond the ends of the outer tube 214 as indicated by the dashed lines 216. Alternatively, the tube 20 may be a single piece with a shape indicative of the tubes 210,212,214.

Figure 8:
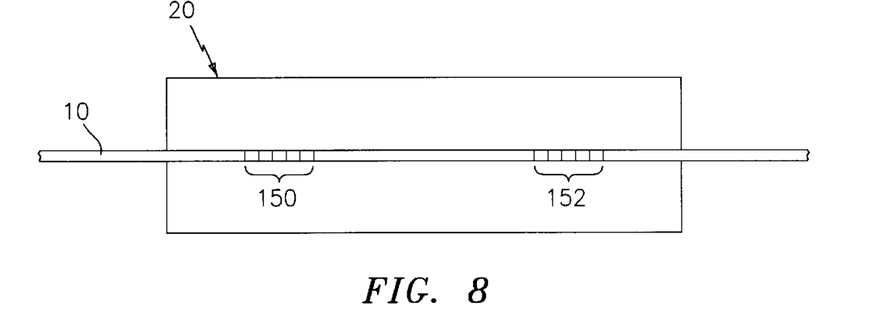
FIG. 8 is a side view of a more than one grating on a fiber encased in a tube, in accordance with the present invention.

Referring to FIG. 8, for any of the embodiments described herein, instead of a single grating encased within the tube 20, two or more gratings 150,152 may be embedded in the fiber 10 that is encased in the tube 20. The gratings 150,152 may have the same reflection wavelengths and/or profiles or different wavelengths and/or profiles. The multiple gratings 150,152 may be used individually in a known Fabry Perot arrangement. Further, one or more fiber lasers, such as that described in U.S. Pat. No. 5,513,913, entitled "Active Multipoint Fiber Laser Sensor", U.S. Pat. No. 5,564,832, entitled "Birefringent Active Fiber Laser Sensor", or U.S. Pat. No. 5,666,372, "Compression Tuned Fiber Laser" may be embedded within the fiber 10 in the tube 20, which are incorporated herein by reference to the extent necessary to understand the present invention. In that case, the gratings 150,152 form an optical cavity and the fiber 10 at least between the gratings 150,152 (and may also include the gratings 150,152 and/or the fiber outside the gratings, if desired) would be doped with a rare earth dopant, e.g., erbium and/or ytterbium, etc.

Figure 14:
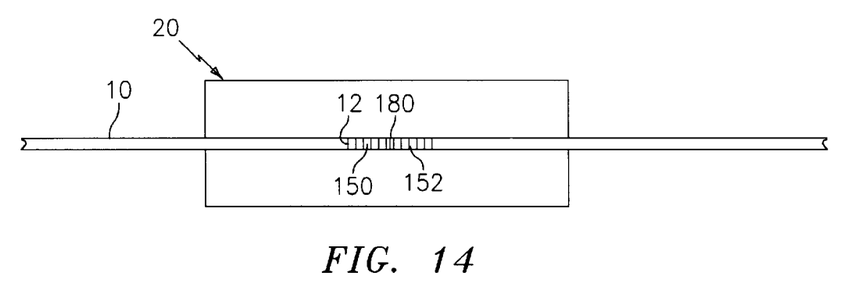
FIG. 14 is a side view of a tunable fiber DFB laser encased in a tube, in accordance with the present invention.

Referring to FIG. 14, another type of tunable fiber laser that may be used is a tunable distributed feedback (DFB) fiber laser, such as that described in V. C. Lauridsen, et al, "Design of DFB Fibre Lasers", Electronic Letters, Oct. 15, 1998, Vol. 34, No. 21, pp 2028–2030; P. Varming, et al, "Erbium Doped Fiber DGB Laser With Permanent π/2 Phase-Shift Induced by UV Post-Processing", IOOC'95, Tech. Digest, Vol. 5, PD1–3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, the grating 12 is written in a rare-earth doped fiber and configured to have a phase shift of $\lambda/2$ (where $\lambda$ is the lasing wavelength) at a predetermined location 180 near the center of the grating 12 which provides a well defined resonance condition that may be continuously tuned in single longitudinal mode operation without mode hopping, as is known. Alternatively, instead of a single grating, the two gratings 150,152 may be placed close enough to form a cavity having a length of $(N+\frac{1}{2})\lambda$ where N is an integer (including 0) and the gratings 150,154 are in rare-earth doped fiber.

Figure 9:
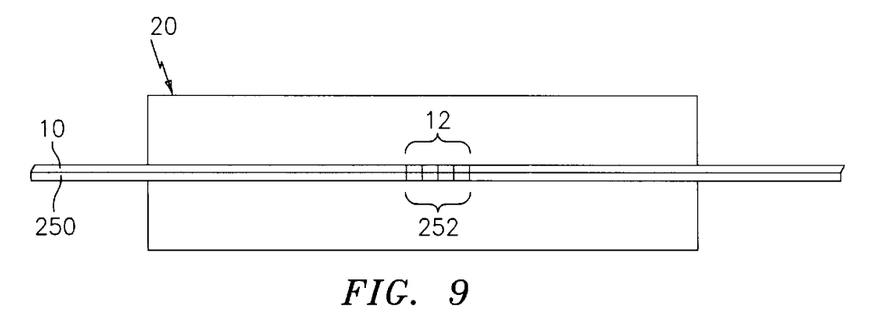
FIG. 9 is a side view of two fiber grating on two separate optical fibers encased in a common tube, in accordance with the present invention.
Figure 10:
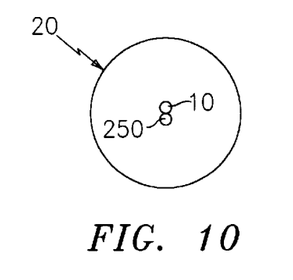
FIG. 10 is an end view of the embodiment of FIG. 9, in accordance with the present invention.

Referring to FIGS. 9 and 10, alternatively, two or more fibers 10,250, each having at least one grating 12,252 therein, respectively, may be encased within the tube 20. In that case, the bore hole in the tube 20 prior to heating and fusing the tube 20 would be large enough to house both fibers and may be other than circular, e.g., square, triangle, etc. Also, the bore hole for the tube 20 need not be centered along the center line of the tube 20.

Figure 11:
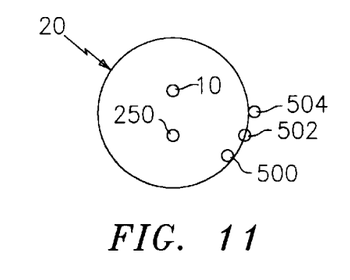
FIG. 11 is an end view of two fiber gratings on two separate optical fibers encased in a common tube and separated by distance, in accordance with the present invention.

Referring to FIG. 11, alternatively, instead of the fibers 10,250 touching each other as shown in FIG. 10, the fibers 10,250 may be spaced apart in the tube 20 by a predetermined distance. The distance may be any desired distance between the fibers 10,250 and have any orientation within the outer diameter of the tube 20. Also, for any of the embodiments shown herein, as discussed hereinbefore, part or all of an optical fiber andlor grating may be fused within, partially within or on the outer surface of the tube 20, as indicated by the fibers 500,502,504, respectively.

Figure 12:
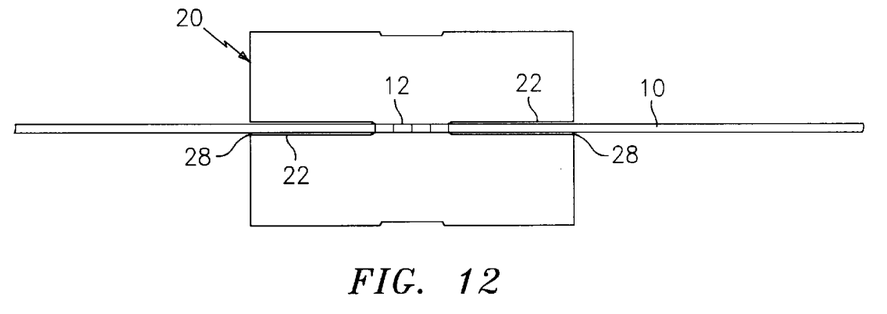
FIG. 12 is a side view of a tube-encased fiber grating where the tube is fused on the fiber only over the length of the grating, in accordance with the present invention.

Referring to FIG. 12, alternatively, the tube 20 may be fused onto the fiber 10 only where the grating 12 is located.

In that case, if the tube 20 is longer than the grating 12, the inner tapered or flared regions 22 discussed hereinbefore may exist and the areas 28 between the tube 20 and the fiber 10 may be filled with a filler material, as discussed hereinbefore.

Figure 13:
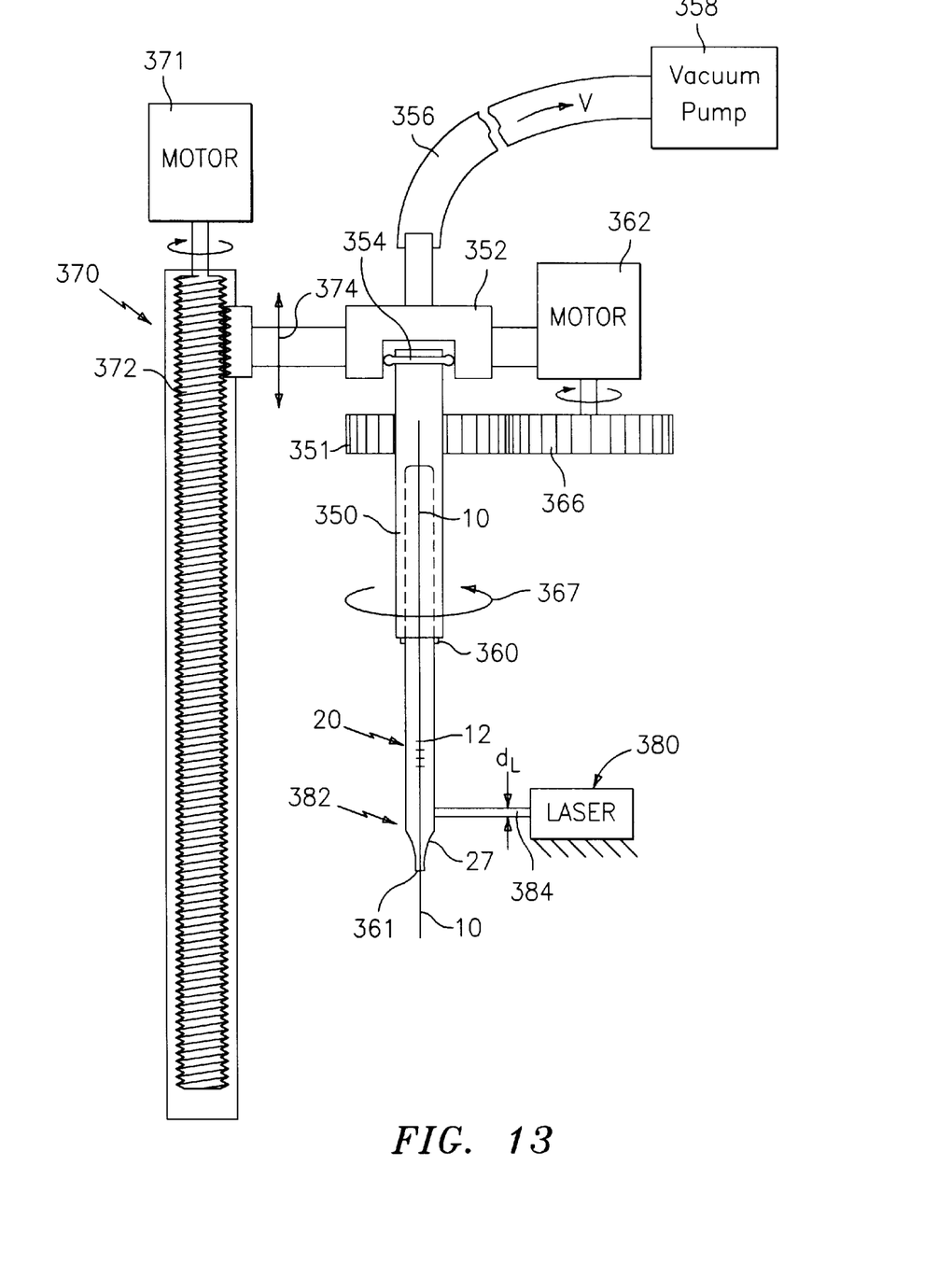
FIG. 13 is a diagram showing a process for encasing a fiber in a glass tube, in accordance with the present invention.

Referring to FIG. 13, one technique and configuration for fusing the tube 20 around the fiber 10 is as follows. The tube 20 is slid over the fiber 10 to a location where the grating 12 exists or will exist. The top end of the tube 20 is connected to the bottom end of a rigid holding, alignment, and vacuum tube 350 having a gear 351 attached thereto. The top end of the tube 350 is connected to one endof a vacuum connector 352 which has a rotating vacuum seal 354. The other end of the vacuum connector 352 is connected to one end of a flexible vacuum tube 356. The other end of the vacuum tube 356 is connected to a vacuum pump 358. The vacuum pump 358 creates a vacuum within the tube 20 to create a collapsing force on the tube 20 sufficient to cause the tube 20 to collapse onto the fiber 10 when heated. The tube 20 is held in place and sealed by an epoxy seal 360 to hold a vacuum in the rigid tube 350. The bottom end 361 of the tube 20 may be plugged or sealed by the outer buffer layer 21 (FIG. 4) of the fiber 10, by epoxy or by other means to allow the vacuum to exist in the tube 20. Other seals may be used.

The connector 352 is attached to a rotating motor 362 that is connected to a gear 366 that meshes with the gear 351 attached to the vacuum tube 350. When the motor 362 rotates, it rotates the gear 366, that rotates the other gear 351, that causes the tube 350, the tube 20, and the fiber 10 to rotate about the longitudinal axis of the fiber 10 and the tube 20, as indicated by the arrow 367. The tube 20 and fiber 10 are rotated to provide even circumferential heating of the tube 20 and the fiber 10.

The connector 352 is also attached to a moving member 368 of a vertical translation stage 370 that has a screw gear 372 that is attached to a second motor 371. The gear 372 meshes with and vertically moves the member 368, the connector 352, and the motor 362 up or down along the translation stage 370 as indcated by arrows 374. Other configurations and hardware may be used to rotate and translate the tube 20.

A stationary heat source 380, such as $CO_2$ laser, e.g., LC-50 laser by DeMaria Electro Optic Systems, provides a predetermined amount of heat to a locaized area 382 of the tube 20 (which performs a laser weld) and is configured to allow the tube to move vertically through the heating area 382. The laser 380 provides a laser beam 384, having a 3 mm diameter with about 30 to 40 Watts of power at the tube 20 at a wavelength of about 10.6 microns. Other powers, beam sizes and shapes may be used provided that the appropriate amount of heat is applied to the tube 20. Also, instead of illuminating the tube 20 on only one side, the tube 20 may be illuminated on multiple locations around the circumference of the tube 20 or completely around the tube 20. In that case, flat or cylindrical mirrors (not shown) may be used to slit and/or reflect the beam 384 simultaneously to desired regions around the circumference of the tube 20.

Other heating devices and/or heating techniques may be used if desired, such as a torch (e.g., a propane/oxygen or oxygen/hydrogen torch), a tungsten (or molybdenum) filament heater, another type of laser, tiny oven (e.g., filament wire within an insulated housing), or any other heating technique that provides sufficient heat to collapse the tube 20 onto the fiber 10. Also, if the heat source 380 applies heat evenly around the circumference of the fiber 10 and the tube 20, the tube 20 and the fiber 10 may not need to be rotated about the longitudinal axis of the fiber 10 during heating.

Instead of a vacuum, other techniques may be used to create a collapsing force on the tube 20. For example, creating an external pressure on the tube 20, while keeping the internal tube pressure below the external pressure. The external pressure may be exerted by mechanical or hydraulic or other means. Alternatively, if the inner diameter d6 (FIGS. 4,6) of the tube 20 is very close to the outer diameter of the fiber, e.g., about 1 micron larger (about 126 micron inner diameter), the tube 20 may collapse onto the fiber 10 under its own surface tension without the need for a vacuum or other collapsing force.

Alternatively, an intermediate or filler material having a similar composition to that of the fiber 10 and the tube 20, such as a fine glass powder or solder (e.g., silica powder), may be used between the fiber 10 and the tube 20 and which becomes fused to both the tube 20 and the fiber 10 to facilitate the fusing process. In that case, the tube 20 may not collapse as much (or at all) as it fuses to the fiber 10.

To fuse the tube 20 to the fiber 10, the tube 20 is heated and fused from the bottom-up (toward the vacuum source) using the heater 380. For a given setion, the tube 20 is heated at a predetermined temperature (e.g., about 1800 deg. C. for a quartz or fused silica tube) until the tube 20 is soft enough to collapse under the collapsing forces and fuse to the tube 20, then the tube 20 is moved to the next section to be heated and fused. Such a heating technique avoids causing bubbles at the tube/fiber interface. For example, the translation stage moves the tube 20 vertically at a rate of about 0.06 mm/sec and the tube 20 is rotated at a rate of about 100 rpm. Other translation and rotation rates may be used if desired.

The longitudinal axis of the tube 20 and fiber 10 are oriented vertically during heating to minimize gravitational effects and optimize axial symmetry; however, other orientations may be used if desired. Also, instead of moving the tube 20 and fiber 10, the heat source 56 may be moved vertically or both the heat source 380 and the fiber/tube may be moved.

Other techniques may be used for collapsing and fusing the tube to the fiber 10, such as is discussed in U.S. Pat. No. 5,745,626, entitled "Method For And Encapsulation Of An Optical Fiber", to Duck et al., and/or U.S. Pat. No. 4,915, 467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber 10 to the tube 20, such as using a high temperature glass solder, e.g., a silica solder (powder or solid), such that the fiber 10, the tube 20 and the solder all become fused to each other, or using laser welding/fusing or other fusing techniques. Also, the fiber may be fused within the tube or partially within or on the outer surface of the tube (discussed hereinafter with FIG. 11).

Instead of sliding the capillary tube 20 over and along the fiber 10 to the desired location, the tube 20 may be split longitudinally into two or more pieces and assembled together at the desired location of the grating 12 for fusing to the fiber 10.

The fluted sections 27 (FIG. 1) may be formed in various ways, such as by heating the tube 20 and pulling the tube 20 and/or the fiber 10. Alternatively, the fluted ends 27 of the tube 20 may be formed using other glass formation techniques such as grinding, polishing or etching the axial ends of the capillary tube 20. Using chemical etching (e.g., with hydrofluoric acid or other chemical etches), laser etching, or laser enhanced chemical etching are some techniques which reduce the outer diameter without applying direct contact force as is required by grinding and polishing. Other techniques may be used to obtain the fluted ends 27. The sections 27 may be created before, during, or after the heating and fusing of the tube 20 to the fiber 10.

Also, the inner tapered region 22 may be created by numerous techniques. For example, not fusing the tube 20 to the fiber 10 in the regions 22 or to create a region 22 that is larger than the inner diameter of the tube 20, the tube 20 may be heated in the desired region to be expanded and internal pressure applied to the tube 20.

The dogbone geometry discussed hereinbefore may be formed by etching, grinding, or polishing the central section of the capillary tube 20 to obtain the narrow diameter d2 and/or the beveled corners 24, such as that described hereinbefore regarding the fluted sections 27. Other techniques may be used to obtain the narrow diameter region 30 and corners 24. After the dogbone (or other geometry) is formed in the tube 20, the surface of the tube 20 may be fire polished to remove surface impurities, to enhance strength, or for other reasons.

Further, for any of the embodiments shown herein, instead of the fiber 10 passing through the tube 20, the fiber 10 may be single-ended, i.e., only one end of the fiber 10 exits the tube 20. In that case, one end of the fiber 10 would be at the exit point of the fiber 10 from the tube 20 or prior to the exit point. Also, the term "tube" as used herein may also mean a block of material having the properties described herein.

Figure 15:
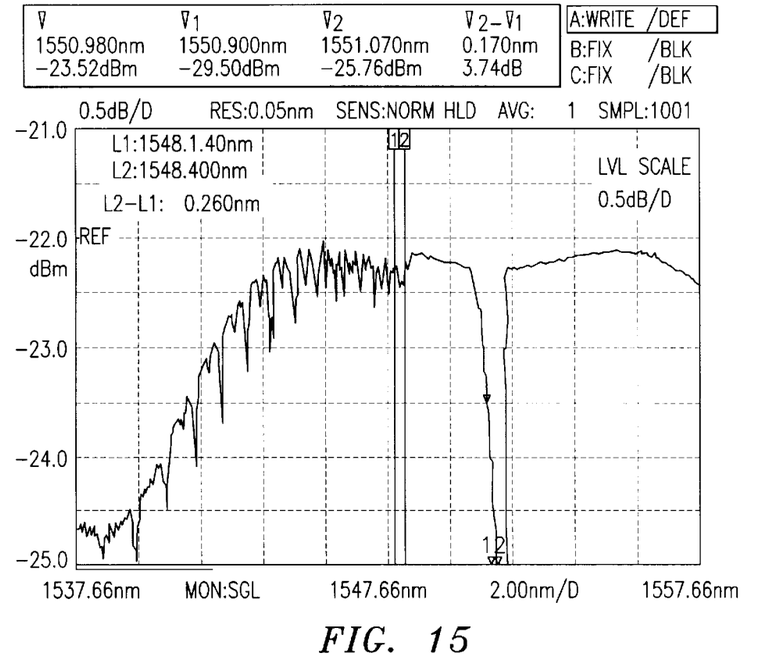
FIG. 15 is a graph of an optical transmission profile of a grating in a standard optical fiber showing cladding mode coupling, in accordance with the present invention.
Figure 16:
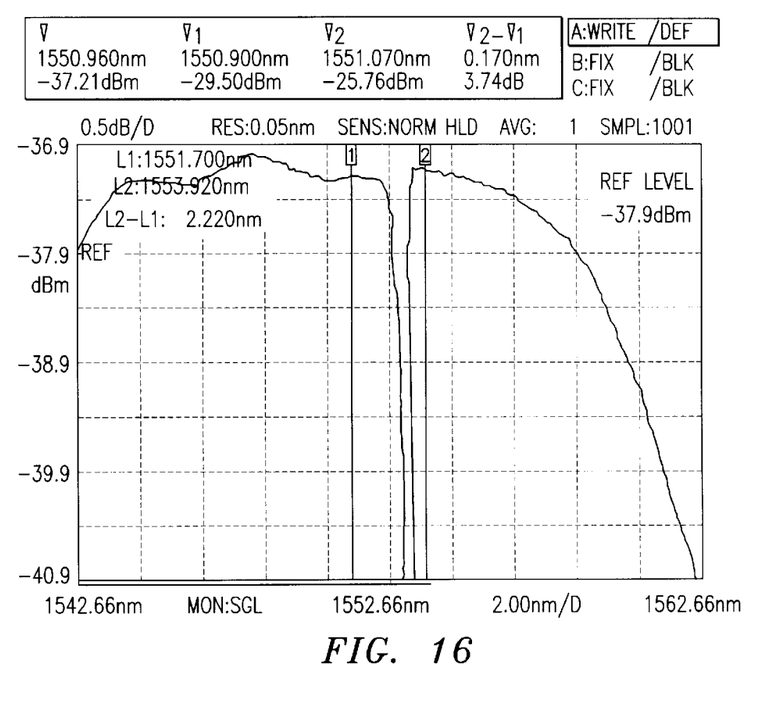
FIG. 16 is a graph of an optical transmission profile of a tubeencased fiber grating showing reduced cladding mode coupling, in accordance with the present invention.

Referring to FIGS. 15,16, we have also found that the present invention also reduces coupling between the core and cladding modes typically caused by a fiber grating, due to the increased end cross-sectional area between the core and cladding of the fiber 10. Thus, a grating 12 written in the core of the optical fiber 10 exhibits less optical transmission loss and a exhibits a cleaner optical profile than a conventional fiber grating because the large cladding region dissipates coupled cladding modes, thereby reducing the coupling of the core to the cladding modes. In general, the greater the difference in cross-sectional area between the core and the cladding, the smaller the mode field overlap and the lower the coupling to the cladding modes. When the tube 20 is fused to the fiber at least where the grating 12 is located, the tube 20 becomes part of the cladding of the fiber 10, as discussed hereinbefore. Accordingly, such an increase in the cladding thickness, reduces the core to cladding coupling typically caused by the grating 12. The thickness of the tube 20 may be set to optimize this effect. FIG. 15 shows an optical transmission profile for a standard grating in an optical fiber having a 9 micron core diameter and 125 micron outer diameter. Such a grating exhibits coupling to the cladding modes as indicated by the spikes 100. FIG. 16 shows an optical transmission profile for a tube-encased grating described herein having a 9 micron core diameter and a 3 mm outer diameter tube 20 which exhibits greatly reduced coupling to the cladding modes as indicated by the lack of spikes on the profile. Other diameters of the fiber core and the tube 20 may be used if desired such that the optical coupling tothe cladding modes is reduced to the desired levels.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A tube-encased fiber optic device, comprising:
   an optical fiber, having at least one Bragg grating embedded therein; and
   a tube, having said optical fiber and said Bragg grating encased therein along a longitudinal axis of said tube, said tube being fused to at least a portion of said fiber at a location where at least a portion of said Bragg grating is located.

2. The apparatus of claim 1 wherein said tube is made of a glass material.

3. The apparatus of claim 1 wherein said tube is fused to said optical fiber on opposite axial sides of said Bragg grating.

4. The apparatus of claim 1, wherein said optical fiber is made of a glass material.

5. The apparatus of claim 1 wherein said tube has at least one outer tapered axial section.

6. The apparatus of claim 1 wherein said tube has at least one axially extended end.

7. The apparatus of claim 1 wherein said tube has at least one inner tapered axial section.

8. The apparatus of claim 1 wherein at least a portion of said tube has a cylindrical shape.

9. The apparatus of claim 1 wherein the shape of said tube comprises a dogbone shape.

10. The apparatus of claim 1, wherein said fiber has at least one pair of Bragg gratings encased in said tube and said fiber is doped with a rare-earth dopant at least between said pair of Bragg gratings to form a fiber laser.

11. The apparatus of claim 10 wherein said fiber laser lases at a lasing wavelength which changes as force on said tube changes.

12. The apparatus of claim 1, wherein at least a portion of said fiber is doped with a rare-earth dopant where said Bragg grating is located and said Bragg grating is configured to form a DFB fiber laser.

13. The apparatus of claim 12 wherein said DFB fiber laser lases at a lasing wavelength which changes as force on said tube changes.

14. The apparatus of claim 1, wherein said tube is fused to said fiber where said Bragg grating is located and said tube has an outer diameter such that optical coupling to cladding modes is less than optical coupling to cladding modes that exists when said tube is fused to said fiber where said Bragg grating is located.

15. The apparatus of claim 1, wherein said tube is fused to said fiber where said Bragg grating is located and said tube has an outer diameter such that optical coupling to cladding modes is substantially eliminated.

16. The apparatus of claim 1 wherein said fiber has a plurality of Bragg gratings encased in said tube.

17. The apparatus of claim 1 wherein said fiber has at least one pair of Bragg gratings encased in said tube and configured in a Fabry Perot arrangement.

18. The apparatus of claim 1, wherein at least a portion of said fiber is doped with a rare-earth dopant where said Bragg grating is located and said Bragg grating is configured to form said DFB fiber laser.

19. A method of encasing an optical Bragg grating in a tube, comprising:
   a) obtaining an optical fiber having a predetermined grating location where a Bragg grating is to be embedded therein;

b) placing a tube around said fiber at said grating location;

c) heating the tube until the tube fuses to at least a portion of the fiber at said grating location such that said predetermined grating location is encased in said tube; and d) embedding a Bragg grating in the fiber at said grating location.

20. The method of claim 19, wherein said step (d) is performed between steps (a) and (b).

21. The method of claim 19 comprising exerting a collapsing force on said tube during said heating step.

22. The method of claim 19 wherein a longitudinal axis of said tube and said fiber is oriented vertically.

23. The method of claim 19 wherein said heating step is performed by a laser.

24. The method of claim 19 wherein said tube is fused to said optical fiber on opposite axial sides of said Bragg grating.

25. The method of claim 19 wherein said step of embedding comprises embedding at least one pair of said Bragg gratings at a corresponding number of grating locations in said fiber and said fiber is doped with a rare earth dopant at least between said pair of Bragg gratings to form a fiber laser.

26. A tube-encased optical Bragg grating, made by a process, comprising the steps of:

a) obtaining an optical fiber having a predetermined grating location where a Bragg grating is to be embedded therein;

b) placing a tube around said fiber at said grating location;

c) heating the tube until the tube fuses to at least a portion of the fiber at said grating location such that said predetermined grating location is encased in said tube; and d) embedding a Bragg grating in the fiber at said grating location.

27. The product by process of claim 26, wherein said step (d) is performed between steps (a) and (b).

28. The product by process of claim 26 comprising exerting a collapsing force on said tube during said heating step.

29. The product by process of claim 26 wherein a longitudinal axis of said tube and said fiber is oriented vertically.

30. The product by process of claim 26 wherein said heating step is performed by a laser.

31. The product by process of claim 26 wherein said tube and said fiber are rotated about a longitudinal axis of said fiber and said tube during said heating step.

32. The product by process of claim 26 wherein said tube is fused to said optical fiber on opposite axial sides of said Bragg grating.

33. A method for encasing an fiber optic Bragg grating in a tube, comprising:

a) obtaining an optical fiber, having at least one Bragg grating embedded therein;

b) placing the tube around said fiber at least where said Bragg grating is located; and c) heating the tube at a predetermined temperature until the tube fuses to at least a portion of said fiber at the location where at least a portion of said Bragg grating is located, such that said Bragg grating is encased in said tube.

34. The method of claim 33 further comprising exerting a collapsing force on said tube during said heating step.

35. The method of claim 33 wherein a longitudinal axis of said tube and said fiber is oriented vertically.

36. The method of claim 33 wherein said heating step is performed by a laser.

37. The method of claim 33 wherein said tube is fused to said optical fiber on opposite axial sides of said Bragg grating.

38. A tube-encased fiber optic device, comprising:

an optical fiber, having at least one Bragg grating embedded therein;

a tube, having said optical fiber and said Bragg grating encased therein along a longitudinal axis of said tube, said tube being fused to at least a portion of said fiber at a location where at least a portion of sid Bragg grating is located; and said at least one Bragg grating being configured as a: fiber laser, DFB fiber laser, or Fabry Perot arrangement.

39. The apparatus of claim 38 wherein said tube is fused to said optical fiber on opposite axial sign of said Bragg grating.

40. The apparatus of claim 38 wherein said fiber has at least one pair of Bragg gratings encased in said tube and said fiber is doped with a rare-earth dopant at least between said pair of Bragg gratings to form said fiber laser.

41. The apparatus of claim 38 in said fiber has at least one pair of Bragg gratings encased in said tube and configured in said Fabry Perot arrangement.

\* \* \* \* \*